US012706377B2

(12) United States Patent
Phillips

(10) Patent No.: US 12,706,377 B2
(45) Date of Patent: Aug. 11, 2026

(54) SYSTEMS, APPARATUS, AND METHODS FOR CALIBRATION OF SATELLITE COMMUNICATION ANTENNAS

(71) Applicant: The Boeing Company, Arlington, VA (US)

(72) Inventor: David Phillips, Seattle, WA (US)

(73) Assignee: The Boeing Company, Arlington, VA (US)

( * ) Notice: Subject to any disclaimer, the term of this patent is extended or adjusted under 35 U.S.C. 154(b) by 262 days.

(21) Appl. No.: 18/339,033

(22) Filed: Jun. 21, 2023

(65) Prior Publication Data

US 2024/0429598 A1 Dec. 26, 2024

(51) Int. Cl.
*H01Q 3/00* (2006.01)
*H01Q 3/08* (2006.01)
(Continued)

(52) U.S. Cl.
CPC ................. *H01Q 3/08* (2013.01); *H01Q 1/28* (2013.01); *H01Q 3/04* (2013.01); *H04B 7/18504* (2013.01)

(58) Field of Classification Search
CPC .. H01Q 3/08; H01Q 3/04; H01Q 3/00; H01Q 1/28
(Continued)

(56) References Cited

U.S. PATENT DOCUMENTS 6,377,211 B1 * 4/2002 Hsiung .................. H01Q 1/125
342/359
6,393,255 B1 5/2002 Lane
(Continued)

FOREIGN PATENT DOCUMENTS

EP 3654549 A1 * 5/2020 ............... H01Q 1/28
JP 2016200478 A 12/2016
(Continued)

OTHER PUBLICATIONS

Ahmad et al., "Received Signal Strength-Based Localization for Vehicle Distance Estimation in Vehicular Ad Hoc Networks (VANETs)," Hindawi, Journal of Sensors, vol. 2023, published Mar. 14, 2023, 15 pages.

(Continued)

*Primary Examiner* — Chuong P Nguyen
(74) *Attorney, Agent, or Firm* — Hanley, Flight & Zimmerman, LLC

(57) ABSTRACT

Systems, apparatus, and methods for calibration of satellite communication antennas are disclosed. An example aerial vehicle includes an antenna; an attitude sensor; machine-readable instructions; and programmable circuitry to at least one of instantiate or execute the machine readable instructions to at least identify a first angular position of the antenna associated with a peak power of a signal received by the antenna when the aerial vehicle is at a first heading; identify a second angular position of the antenna associated with a peak power of a signal received by the antenna when the aerial vehicle is at a second heading, the second heading different than the first heading; determine an offset between the attitude sensor and the antenna based on the first angular position and the second angular position; and cause a pointing angle of the antenna relative to an external source to be adjusted based on the offset.

6 Claims, 7 Drawing Sheets

(51) Int. Cl.
*H01Q 1/28* (2006.01)
*H01Q 3/04* (2006.01)
*H04B 7/185* (2006.01)

(58) Field of Classification Search
USPC .......................................................... 342/359
See application file for complete search history.

(56) References Cited

U.S. PATENT DOCUMENTS

| | | | | |
|---|---|---|---|---|
| 6,417,803 | B1 * | 7/2002 | de La Chapelle | H01Q 1/28 342/359 |
| 6,646,598 | B1 * | 11/2003 | Timothy | G01S 7/4026 342/359 |
| 7,009,558 | B1 | 3/2006 | Fall et al. | |
| 7,289,062 | B2 | 10/2007 | Hudson et al. | |
| 8,730,115 | B2 * | 5/2014 | Yeshanov | H01Q 3/00 343/760 |
| 9,608,716 | B1 | 3/2017 | Elwailly et al. | |
| 10,211,508 | B2 * | 2/2019 | Merrell | H01Q 1/1257 |
| 10,277,308 | B1 * | 4/2019 | Cross | H01Q 1/28 |
| 10,320,073 | B2 * | 6/2019 | Sleight | H01Q 3/08 |
| 11,616,565 | B2 * | 3/2023 | Miranda | H04B 7/0632 455/431 |
| 11,909,468 | B2 * | 2/2024 | Merrell | H04B 7/18508 |
| 12,135,191 | B2 * | 11/2024 | Famularo | G05D 1/0094 |
| 2010/0062706 | A1 | 3/2010 | Mills et al. | |
| 2010/0315288 | A1 * | 12/2010 | Liu | G01S 3/40 342/359 |
| 2017/0254903 | A1 * | 9/2017 | Johnson | G01S 3/42 |
| 2019/0349074 | A1 | 11/2019 | Petranovich et al. | |

FOREIGN PATENT DOCUMENTS

| | | | | |
|---|---|---|---|---|
| WO | 2017017101 | A1 | 2/2017 | |
| WO | WO-2018125700 | A1 * | 7/2018 | H01Q 1/1257 |

OTHER PUBLICATIONS

Ilakkiya et al., "Automatic Antenna Positioning System," Proceedings of the International Conference on Science and Innovative Engineering, Apr. 3, 2016, 7 pages.
Kim et al., "A Study on the Tracking Antenna System for Satellite Communication Using Embedded Controller," ICCAS, Aug. 25-27, 2004, 4 pages.
Zhang et al., "Robot-Assisted Backscatter Localization for IoT Applications," IEEE Transactions on Wireless Communications, vol. 9, No. 9, published Jun. 3, 2020, 13 pages.
Antesky, "What Are Methods for Antenna Tracking System?" retrieved from www.antesky.com/what-are-methods-for-antenna-tracking-system/ on Apr. 17, 2023, 7 pages.
SBG Systems, "Inertial Sensors for Antenna tracking systems and SATCOM On-The-MOVE (SOTM)," Antenna Pointing & SATCOM OTM, retrieved from https://www.sbg-systems.com/applications/antenna-tracking-sat-otm/ on Jun. 14, 2023, 6 pages.

* cited by examiner

SYSTEMS, APPARATUS, AND METHODS FOR CALIBRATION OF SATELLITE COMMUNICATION ANTENNAS

FIELD OF THE DISCLOSURE

This disclosure relates generally to satellite communication antennas and, more particularly, to systems, apparatus, and methods for calibration of satellite communication antennas.

BACKGROUND

A satellite communication (SATCOM) antenna can be carried by a mobile platform such as an aerial vehicle. The position of the SATCOM antenna can be adjusted to direct a beam of the antenna toward, for instance, a satellite to receive signals from the satellite and/or to transmit signals to the satellite.

SUMMARY

An example aerial vehicle includes an antenna; an attitude sensor; machine-readable instructions; and programmable circuitry to at least one of instantiate or execute the machine readable instructions to at least identify a first angular position of the antenna associated with a peak power of a signal received by the antenna when the aerial vehicle is at a first heading; identify a second angular position of the antenna associated with a peak power of a signal received by the antenna when the aerial vehicle is at a second heading, the second heading different than the first heading; determine an offset between the attitude sensor and the antenna based on the first angular position and the second angular position; and cause a pointing angle of the antenna relative to an external source to be adjusted based on the offset.

An example non-transitory machine readable storage medium comprising instructions to cause programmable circuitry to at least cause an antenna carried by a mobile platform to move when the mobile platform is associated with first attitude data; identity, based on a received signal strength of a signal received by the antenna when the mobile platform is associated with the first attitude data, a first set of pointing coordinates for the antenna; cause the antenna to move when the mobile platform is associated with second attitude data; identify, based on a received signal strength of a signal received by the antenna when the mobile platform is associated with the second attitude data, a second set of pointing coordinates for the antenna; determine an offset between the antenna and an attitude sensor of the mobile platform based on the first set of pointing coordinates and the second set of pointing coordinates; and modify an output of the attitude sensor of the mobile platform based on the offset.

An example apparatus includes interface circuitry; machine readable instructions; and programmable circuitry to at least one of instantiate or execute the machine readable instructions to at least identify a first angular position of an antenna of a mobile platform when the mobile platform is associated with first attitude data, the first attitude data measured by an attitude sensor of a mobile platform at a first time; identify a second angular position of the antenna when the mobile platform is associated with second attitude data, the second attitude data measured by the attitude sensor at a second time, the second time after the first time; determine an installation offset between the attitude sensor and the antenna based on the first angular position, the second angular position, the first attitude data, and the second attitude data; and cause position of the antenna relative to an external source to be determined based on the installation offset.

An example method for calibrating a satellite communication antenna includes detecting a first angular position of the antenna associated with a peak power of a signal received by the satellite communication antenna when a mobile platform carrying the satellite communication antenna is at a first heading; detecting a second angular position of the satellite communication antenna associated with a peak power of a signal received by the satellite communication antenna when the mobile platform is at a second heading, the second heading different than the first heading; identifying an installation offset between an attitude sensor of the mobile platform and the satellite communication antenna based on the first angular position and the second angular position; and causing a pointing angle of the satellite communication antenna relative to an external source to be adjusted based on the installation offset.

BRIEF DESCRIPTION OF THE DRAWINGS

In general, the same reference numbers will be used throughout the drawing(s) and accompanying written description to refer to the same or like parts. The figures are not necessarily to scale.

Figure 1:
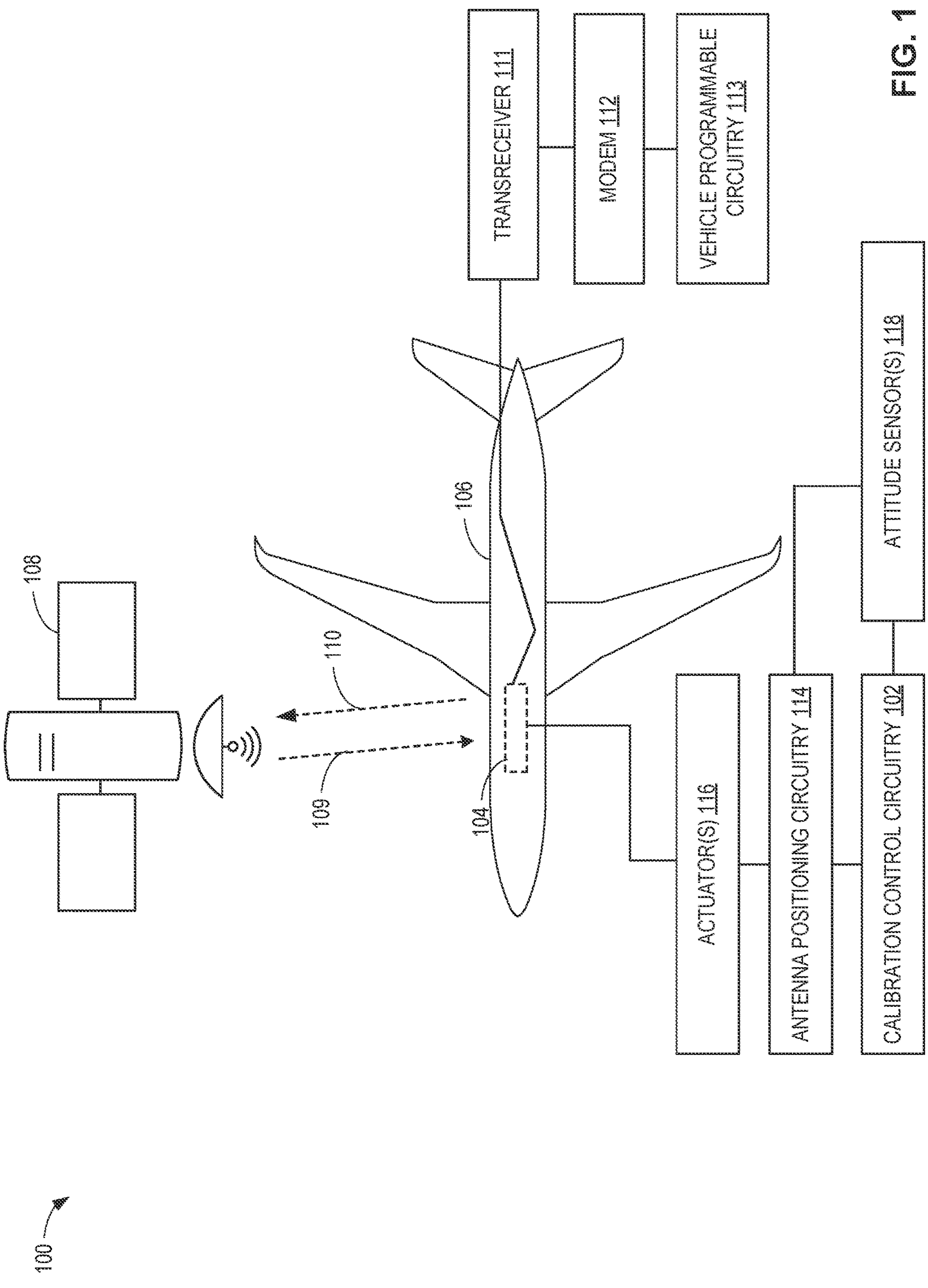
FIG. 1 illustrates an example system including example calibration control circuitry to calibrate an antenna carried by a mobile platform.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

A satellite communication (SATCOM) antenna can be carried by a mobile platform such as an aerial vehicle. The position of the SATCOM antenna can be adjusted to direct a beam of the antenna toward, for instance, a satellite to receive signals from the satellite and/or to transmit signals to the satellite. Antenna positioning systems can execute pointing algorithm(s) that use a position of the mobile platform and inertial data for the platform to move (e.g., point, steer, direct) the antenna relative to the satellite. Position and inertial data for the mobile platform can be obtained from outputs of attitude sensor(s) (e.g., inertial measurement unit(s)) of the platform. The degree of accuracy with which the antenna beam is pointed toward the satellite affects receipt of the signals and, as a result, performance of the SATCOM system. Therefore, any installation offsets (e.g., sensor bias) between the attitude sensor(s) of the mobile platform and the antenna can affect the accuracy with which the antenna is pointed toward the satellite.

Some known mobile SATCOM antennas include a global positioning system (GPS) with an inertial measurement unit (IMU) from which attitude information (e.g., roll, pitch, heading) of the mobile platform can be derived or estimated. The attitude data obtained from the GPS/IMU of the antenna is used by the antenna pointing algorithms to steer the antenna. In such instances, because the GPS/IMU is integrated with the antenna, any uncertainties with respect to the differences of the position and attitude of the mobile platform relative to the SATCOM antenna are minimized. Put another way, any offsets with respect to the GPS/IMU are fixed during production of the antenna and are not affected by installation of the antenna including the integrated GPS/IMU on the mobile platform.

However, in some examples, a mobile platform such as a military aerial vehicle, may include a SATCOM antenna and attitude sensor(s) (e.g., IMU(s)) that are separate from the antenna. Thus, measurement bias due to (a) installation of the sensor(s) and/or the antenna and/or (b) changes in the physical properties of the installed sensor(s) and/or the antenna over time (e.g., exposure to stress) can introduce uncertainties with respect to the position and attitude of the platform relative to the antenna. As discussed above, the antenna pointing algorithm(s) use platform location and attitude data to determine a direction in which to point the satellite. Thus, the accuracy with which the antenna is pointed is compromised by offsets between the attitude sensor(s) and the antenna, which can result in lost or diminished signal and reduced performance of the SATCOM system.

Some known methods for identifying offsets between the platform attitude sensor(s) and the antenna include the use of lasers during manufacture of the platform and installation of the antenna. However, such laser-based techniques for identifying offsets can be time consuming and costly. Moreover, in some instances, the attitude sensor(s) and/or the antenna are replaced when the mobile platform is in operation. For example, an antenna of a military plane may be replaced while the plane is on a deck of an aircraft carrier. In such environments, the use of lasers to identify installation offsets may not be practical.

Disclosed herein are example systems, apparatus, and methods to calibrate a SATCOM antenna of a mobile platform (e.g., an aerial vehicle) based on differences between the position and attitude of the platform and the position of the antenna. Examples disclosed herein record roll, pitch, and heading of the mobile platform at a first time and point the antenna toward an external source such as a satellite while the platform is at the particular roll, pitch, and heading. The antenna position is adjusted until peak power (e.g., maximize received signal strength) is detected for the signal received from the satellite based on alignment between the antenna beam and satellite. Examples disclosed herein identify the angular position (e.g., pointing coordinates) of the antenna associated with the detection of the peak power for the received signal. Examples disclosed herein move the mobile platform to a new roll, pitch, and heading at a second time and repeat the pointing of the antenna toward the satellite until peak power is achieved while the platform is at the particular roll, pitch, and heading.

Examples disclosed herein identify any installation offsets between (a) the roll, pitch, and heading measurements by the attitude sensor (e.g., attitude sensor zero point (0, 0, 0)) and (b) the pointing coordinates of the antenna (e.g., antenna zero point (0, 0, 0) when the platform is at a particular heading and peak power from the received signal is achieved. In examples disclosed herein, roll, pitch, and heading values are determined using the antenna pointing coordinates collected when the mobile platform is at a first heading and a second heading and algorithms such as triangulation. Installation offsets for the roll, pitch, and/or heading values measured by the attitude sensor(s) can be identified based on differences between the measured value(s) and the roll, pitch, and/or heading values determined using the antenna pointing coordinates. The determined offset(s) can be used to adjust the pointing algorithms executed by the antenna positioning system to facilitate accurate pointing of the antenna using the position and attitude data for the platform. Examples disclosed herein can be implemented during, for instance, taxiing of the mobile platform on a runway to calibrate the antenna during operation of the platform. Thus, examples disclosed herein provide for efficient calibration of the STACOM antenna that can be implemented in the field and applied in instances in which the sensor(s) and/or antenna are installed or replaced.

FIG. 1 illustrates an example system 100 including calibration control circuitry 102 to calibrate an antenna 104 carried by a mobile platform 106. In the example of FIG. 1, the mobile platform 106 is an aerial vehicle and, in particular, an unmanned aerial vehicle. The mobile platform 106 can include other types of aerial vehicles (e.g., an airplane or other aerial vehicle) and/or other types of vehicles (e.g., a land vehicle, a water vehicle). Thus, the mobile platform 106 can differ from the example shown in FIG. 1. In the example of FIG. 1, the antenna 104 is coupled to an exterior surface of a fuselage of the mobile platform 106. However, the antenna 104 can be coupled to other portions of the mobile platform 106.

The antenna 104 emits a beam (e.g., a signal) that enables the mobile platform 106 to communicate with an external source 108 via transmission of signals. In the example of FIG. 1, the external source 108 is a satellite. The antenna 104 can receive signals from the satellite 108 (e.g., downlink signals), as represented by arrow 109 in FIG. 1. In some examples, the antenna 104 can transmit signals to the satellite 108 (e.g., uplink signals), as represented by arrow 110 in FIG. 1. A transceiver 111 and a modem 112 can facilitate the receipt and transmission of the signals and distribution of the signals for analysis by, for example, programmable circuitry 113 (e.g., vehicle control circuitry) of the mobile platform 106. The example antenna 104 of FIG. 1 can include a reflector antenna. However, other types of antennas 104 can additionally or alternatively be carried by the mobile platform 106.

The mobile platform 106 of FIG. 1 includes antenna positioning circuitry 114 (e.g., programmable circuitry) to control a position of the antenna 104 relative to the satellite 108. The mobile platform 106 of FIG. 1 includes actuator(s) 116 to cause the antenna 104 to move based on instructions generated by the antenna positioning circuitry 114. In particular, the antenna positioning circuitry 114 generates instructions to cause the actuator(s) 116 to position the antenna 104 relative to the satellite 108 to, for instance, increase (e.g., maximize) a strength of the signal received from the satellite 108. In the example of FIG. 1, the satellite 108 is a geostationary satellite such that the satellite 108 can be considered as fixed relative to a point on Earth. Thus, the location of the satellite 108 is known.

The mobile platform 106 includes attitude sensor(s) 118 to output signals representing attitude data for the mobile platform 106 at a given time, including roll, pitch, and heading. In the example of FIG. 1, the attitude sensor(s) 118 include an inertial measuring unit (IMU). The IMU includes sensors such as accelerometer(s), gyroscope(s), and magnetometer(s). The antenna positioning circuitry 114 uses data obtained from the signals output by the attitude sensor(s) 118 to control the position of the antenna 104 as the mobile platform 106 moves (e.g., flies) in an environment. For example, the attitude data can be used by the antenna positioning circuitry 114 to execute antenna pointing algorithms to cause the actuator(s) 116 to move the antenna 104 to point the beam in a particular direction based on the position and attitude data for the mobile platform 106.

In the example of FIG. 1, the attitude sensor(s) 118 are carried by the mobile platform 106 separate from the antenna 104. Put another way, the attitude sensor(s) 118 are separately installed from the antenna 104. Thus, installation offsets between the attitude sensor(s) 118 and the antenna 104 (e.g., between an attitude sensor zero point (0, 0, 0) and the antenna zero point (0, 0, 0)) can affect an accuracy with which the antenna positioning circuitry 114 points the antenna 104 using data from the attitude sensor(s) 118. Also, offsets can be introduced during operation of the mobile platform 106 as, for example, the attitude sensor(s) 118 are exposed to stress or replaced.

The example calibration control circuitry 102 of FIG. 1 generates calibration data to account for any offsets between the attitude sensor(s) 118 and the antenna 104. The calibration data is used to update or adjust the antenna pointing algorithms executed by the antenna positioning circuitry 114 to steer or point the antenna 104. In the example of FIG. 1, the calibration control circuitry 102 generates the calibration data based on movement of the mobile platform 106 to different roll, pitch, and heading values and pointing of the antenna 104 at the satellite 108 when the mobile platform 106 is at a particular heading. In particular, the calibration control circuitry 102 identifies when the antenna 104 is pointed such that the antenna beam is aligned with the satellite 108 to achieve peak signal power for the received signal when the mobile platform 106 is at the particular heading. As disclosed herein, the calibration control circuitry 102 uses the angular positions of the antenna 104 associated with the detection of peak power when the mobile platform 106 is at the different headings to solve for associated roll, pitch, and heading values of the mobile platform 106 (e.g., using triangulation). The calibration control circuitry 102 identifies offsets for the roll, pitch, and heading values measured by the attitude sensor(s) 118 based on the roll, pitch, and heading values determined using the antenna pointing angles.

In some examples, the calibration control circuitry 102 is activated to perform the calibration in response to user input(s) received in connection with operation of the mobile platform 106 (e.g., in response to replacement of the antenna 104 and/or the sensor(s) 118). In response to the input(s), the mobile platform 106 enters a calibration mode in which the calibration control circuitry 102 generates instructions to cause, for example, the mobile platform 106 to move to different headings and for the antenna 104 to be pointed to achieve peak signal strength for the signal received from the satellite 108. In some examples, the calibration control circuitry 102 periodically enters the calibration mode during, for instance, flight or taxiing of the mobile platform 106, based on, for instance, a particular (e.g., pre-defined) calibration schedule.

Figure 2:
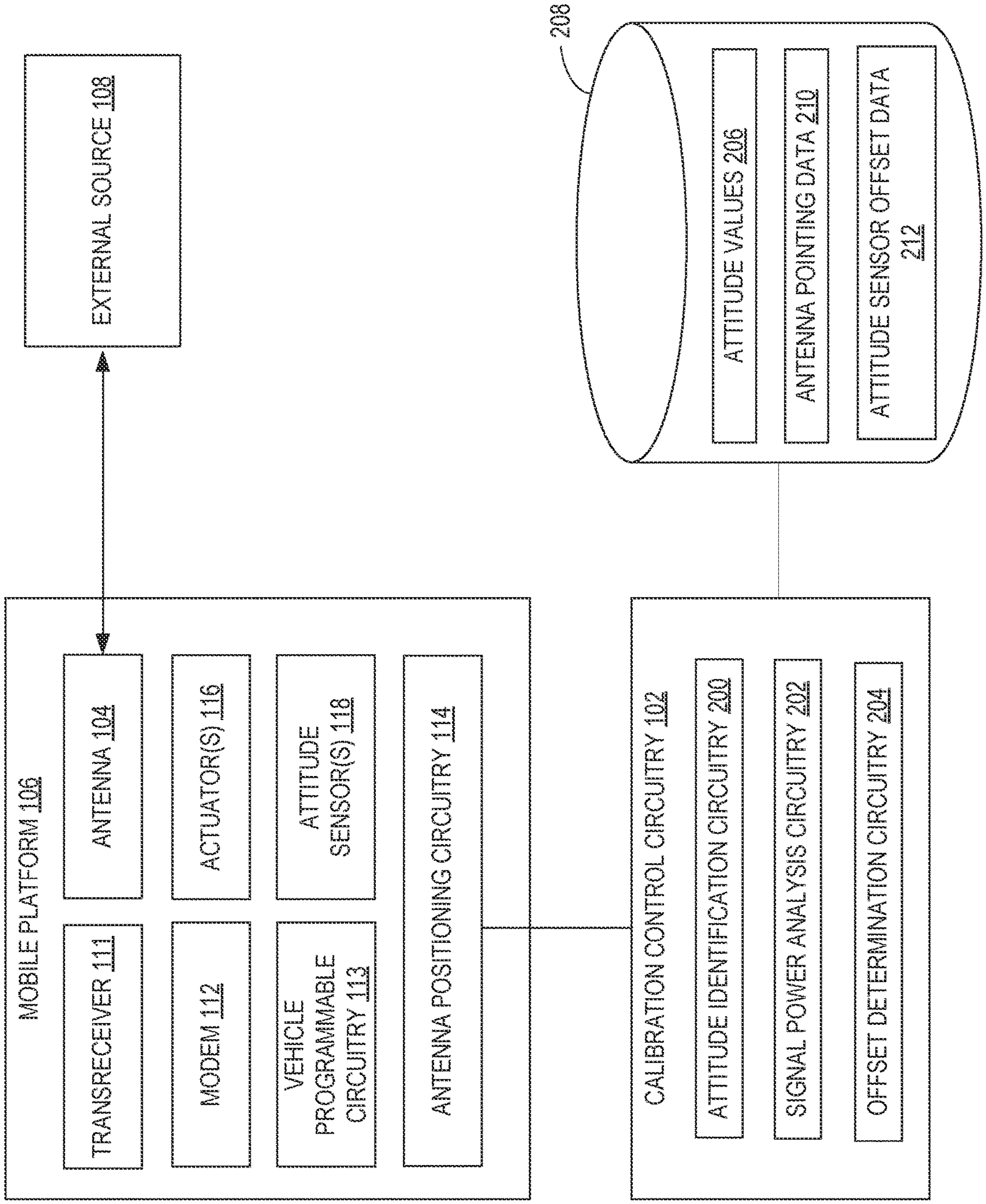
FIG. 2 is a block diagram of an example implementation of the calibration control circuitry of FIG. 1.

FIG. 2 is a block diagram of an example implementation of the calibration control circuitry 102 of FIG. 1 to generate calibration data for use in positioning the antenna 104 of the mobile platform 106 of FIG. 1. The calibration control circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the calibration control circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In some examples, the calibration control circuitry 102 is implemented by, for example, the programmable circuitry 113 of the mobile platform 106. In some examples, one or more components of the calibration control circuitry 102 are implemented by, for example, programmable circuitry of a user device, one or more cloud-based devices, etc. and is in communication with the antenna positioning circuitry 114 of the mobile platform 106 via one or more wired or wireless communication protocols.

The example calibration control circuitry 102 of FIG. 2 includes attitude identification circuitry 200, signal power analysis circuitry 202, and offset determination circuitry 204. In some examples, the attitude identification circuitry 200 is instantiated by programmable circuitry executing attitude identification instructions and/or configured to perform operations such as those represented by the flowchart of FIG. 3. In some examples, the signal power analysis circuitry 202 is instantiated by programmable circuitry executing signal power analysis instructions and/or configured to perform operations such as those represented by the flowchart of FIG. 3. In some examples, the offset determination circuitry 204 is instantiated by programmable circuitry executing offset determination instructions and/or configured to perform operations such as those represented by the flowchart of FIG. 3.

As disclosed in connection with FIG. 1, the mobile platform 106 can enter a calibration mode in which the calibration control circuitry 102 generates calibration data for positioning the antenna 104 of the mobile platform 106 to account for installation offset(s) between the attitude sensor(s) 118 and the antenna 104. When the calibration mode is active, the attitude identification circuitry 200 of the calibration control circuitry 102 generates instructions to cause the mobile platform 106 to move to different headings (e.g., a direction in which the mobile platform 106 is pointed along a longitudinal axis) over time. The attitude identification circuitry 200 can communicate with, for example, the vehicle programmable circuitry 113 (e.g., vehicle control circuitry) of the mobile platform 106 to cause the mobile platform 106 to move to the particular headings. In some examples, the mobile platform 106 moves to the different headings during, for example, taxi of the mobile platform 106 on a runway.

The attitude identification circuitry 200 accesses the outputs of the attitude sensor(s) 118 when the mobile platform 106 is at each heading and records corresponding heading, roll, and pitch values 206 measured by the attitude sensor(s) 118. The attitude values 206 (i.e., roll, pitch, heading) recorded by the attitude identification circuitry 200 are stored in a database 208. In some examples, the calibration control circuitry 102 includes the database 208. In some examples, the database 208 is in a location accessible to the calibration control circuitry 102 as shown in FIG. 2.

For example, to perform the calibration, the mobile platform 106 moves to a first heading at a first time (e.g., based on instructions generated by the vehicle control circuitry 113, based on user input(s) and/or manipulating of the mobile platform, etc.). The attitude identification circuitry 200 records the roll, pitch, and heading measurements of the attitude sensor(s) 118 when the mobile platform 106 is at the first heading. For purposes of the calibration analysis, the roll, pitch, and heading measurements generated by the attitude sensor(s) when the mobile platform 106 is at the first heading can be considered to be a zero point (0, 0, 0) for the attitude sensor(s) 118.

When the mobile platform 106 is at the first heading, the signal power analysis circuitry 202 communicates with the antenna positioning circuitry 114 to cause the actuator(s) 116 to move the antenna 104 to different angular positions to scan or steer the antenna beam relative to (e.g., toward) the satellite 108. As the antenna 104 is moved to different angular positions (e.g., different (x, y, z) pointing coordinates), the modem 112 identifies the power or signal strength of the signal(s) received from the satellite 108 when the antenna 104 is at the different pointing positions.

The signal power analysis circuitry 202 analyzes the received signal strength detected by the modem 112 when the antenna 104 is moved to the different pointing positions while the mobile platform 106 is at the first heading. Based on the data captured by the modem 112, the signal power analysis circuitry 202 determines the position (i.e., pointing coordinates) of the antenna 104 at which a peak power or maximum received signal strength has been achieved for the signal(s) received from the satellite 108. In some examples, the signal power analysis circuitry 202 verifies the peak power measured by the modem 112 in view of known design parameters of the antenna 104, such as a beamwidth (e.g., area of peak radiation intensity associated with a main lobe of the antenna beam). In some examples, the signal power analysis circuitry 202 verifies that the maximum received signal strength has been achieved based on threshold(s) (e.g., user-defined thresholds).

The signal power analysis circuitry 202 communicates with the antenna positioning circuitry 114 to identify the pointing coordinates (e.g., (x, y, z)) of the antenna 104 associated with the peak power while the mobile platform 106 is at the first heading. The antenna pointing coordinates associated with the peak power measurement are stored in the database 208 as antenna pointing data 210 and correlated with the attitude values 206 for the mobile platform 106 at the first heading. For purposes of the calibration analysis, the antenna pointing coordinates associated with the peak power when the mobile platform 106 is at the first heading can be considered to be correlated to a zero point (0, 0, 0) for the antenna 104.

After the antenna pointing position associated with the peak power measurement is identified when the mobile platform 106 is at the first heading, the attitude identification circuitry 200 communicates with the vehicle programmable circuitry 113 to cause the mobile platform 106 to move to a second heading different than the first heading at a second time (i.e., after the first time). For example, the second heading may correspond to a 90° difference from the first heading. Other differences between the first and second heading may be used. When the mobile platform 106 is at the second heading, the attitude identification circuitry 200 stores the corresponding attitude values 206 (roll, pitch, heading) for the mobile platform 106 in the database 208.

When the mobile platform 106 is at the second heading, the signal power analysis circuitry 202 communicates with the antenna positioning circuitry 114 to cause the actuator(s) 116 to move the antenna 104 to different pointing angles relative to the satellite 108. Thus, in the calibration mode, the scanning or steering of the antenna 104 is repeated when the mobile platform 106 is positioned at each heading. The modem 112 records the received signal strength of the signal(s) received from the satellite 108 when the antenna 104 is at the different angular positions and the mobile platform is at the second heading.

The signal power analysis circuitry 202 identifies the position (e.g., pointing coordinates) of the antenna 104 associated with peak power when the mobile platform 106 is at the second heading. The signal power analysis circuitry 202 stores the pointing coordinates of the antenna 104 at which maximum received signal strength was measured while the mobile platform 106 is at the second heading in the database 208 as the antenna pointing data 210.

Thus, as a result of the calibration process, the calibration control circuitry 102 obtains (a) a first set of antenna pointing coordinates ($x_{\_1}$, $y_{\_1}$, $z_{\_1}$) associated with peak power when the mobile platform 106 is at a first heading associated with first attitude values ($roll_{\_1}$, $pitch_{\_1}$, and $heading_{\_1}$). (b) a second set of antenna pointing coordinates ($x_{\_2}$, $y_{\_2}$, $z_{\_2}$) associated with peak power when the mobile platform 106 is at a second heading associated with second attitude values ($roll_{\_2}$, $pitch_{\_2}$, and $heading_{\_2}$). As disclosed herein, the antenna pointing algorithms executed by the antenna positioning circuitry 114 use the roll, pitch, and heading values output by the attitude sensor(s) 118 to point the antenna 104 relative to the satellite 108 (or another external source). Also, the position of the satellite 108 is known and considered to be substantially constant. Thus, the two sets of pointing coordinates of the antenna 104 when peak power is achieved can be used to determine a location of the mobile platform 106.

Assuming there is no offset between the attitude sensor(s) 118 and the antenna 104, then the roll, pitch, and heading values determined using the antenna pointing coordinates correspond to the attitude data of the mobile platform 106. However, as discussed herein, offsets between the attitude sensor(s) 118 and the antenna 104 can arise during installation, maintenance, and/or operation of the sensor(s) 118 and/or the antenna 104. In the example of FIG. 2, offset(s) between the attitude sensor(s) 118 and the antenna 104 are represented by any difference(s) between (a) roll, pitch, and/or heading of the mobile platform 106 as determined using the antenna pointing coordinates and (b) the roll, pitch, and/or heading measurements by the attitude sensor(s) 118.

The offset determination circuitry 204 uses the two sets of antenna pointing coordinates obtained when the mobile platform 106 is at the first heading and the second heading, respectively, to determine any offsets for the roll, pitch, or heading values of the attitude sensor(s) 118. In the example of FIG. 2, the offset determination circuitry 204 identifies roll, pitch, and heading for the mobile platform 106 using (a) the angular position ($x_{\_1}$, $y_{\_1}$, $z_{\_1}$) of the antenna 104 associated with peak power when the mobile platform 106 is at the first attitude values ($roll_{\_1}$, $pitch_{\_1}$, and $heading_{\_1}$); (b) the angular position ($x_{\_2}$, $y_{\_2}$, $z_{\_2}$) of the antenna 104 associated with the peak power when the mobile platform 106 is at the second attitude values ($roll_{\_2}$, $pitch_{\_2}$, and $heading_{\_2}$); and (c) the translation of the mobile platform 106 between when the pointing coordinates where identified. For example, the offset determination circuitry 204 can use triangulation to solve for the unknown roll, pitch, and heading values for the mobile platform 106 using the two sets of pointing coordinates of the antenna 104 (i.e., ($x_{\_1}$, $y_{\_1}$, $z_{\_1}$) and ($x_{\_2}$, $y_{\_2}$, $z_{\_2}$)) and the difference between the first heading and the second heading of the mobile platform 106 when each of the pointing coordinates was recorded.

The offset determination circuitry 204 performs a comparison of (a) the roll, pitch, and heading values determined using the two sets of pointing coordinates associated with the peak power measurements and (b) the roll, pitch, and heading values measured by the attitude sensor(s) 118 when the mobile platform 106 was at the first heading (e.g., the assumed sensor zero point values). Based on the comparison, the offset determination circuitry 204 determines whether any of attitude values (i.e., roll, pitch, and/or heading) of the mobile platform 106 as measured by the attitude sensor(s) is offset relative to attitude values determined using the pointing coordinates for the antenna 104. For example, if the attitude sensor(s) 118 indicated that the first heading of the mobile platform 106 was 86° and the result of the triangulation determines a heading of 84° based on the antenna pointing coordinates associated with the peak power measurements, then the offset determination circuitry 204 determines a 2° installation offset between the attitude sensor(s) 118 and the antenna 104. In some examples, the offset(s) for the roll, pitch, and/or heading values are determined based on average differences between the roll, pitch, and heading values determined using the two sets of pointing coordinates and the outputs of the attitude sensor(s) 118 collected at different times.

The offset determination circuitry 204 stores the determined offset(s) as attitude sensor offset data 212 in the database 208. In some examples, the offset determination circuitry 204 provides the attitude sensor offset data 212 to the antenna positioning circuitry 114 for use in adjusting and/or updating the pointing algorithm(s). In some examples, the antenna positioning circuitry 114 accesses the attitude sensor offset data 212 from the database 208 to adjust the antenna pointing algorithms and/or the attitude data used by the antenna pointing algorithms. For example, the attitude sensor offset data 212 can serve as or define an adjustment factor that is to be applied to the measurement(s) (e.g., roll, pitch, heading) output by the attitude sensor(s) 118 when the antenna positioning circuitry 114 executes the pointing algorithm(s) to position the antenna 104 relative to the satellite 108. After the calibration, the antenna pointing algorithm(s) use the adjusted attitude data to position the antenna 104 rather than relying on, for example, the measurements from the attitude sensor(s) 118 that do not account for the installation offset. Therefore, as a result of the calibration, the antenna pointing algorithms executed by the antenna positioning circuitry 114 address the installation offset(s) between the attitude sensor(s) 118 and the antenna 104 when determining a pointing angle for the antenna 104.

Although the example calibration process performed by the calibration control circuitry 102 is discussed in connection with movement of the mobile platform 106 to a first heading and a second heading, the movement of the mobile platform 106 and corresponding positioning of the antenna 104 to achieve maximum received signal strength can be repeated more than once. The additional antenna pointing coordinate data obtained when the mobile platform 106 is at the subsequent headings can be used to further identify the installation offsets and update or refine the antenna pointing algorithms.

In some examples, the calibration control circuitry 102 includes means for identifying attitude data. For example, the means for identifying may be implemented by the attitude identification circuitry 200. In some examples, the attitude identification circuitry 200 may be instantiated by programmable circuitry such as the example programmable circuitry 412 of FIG. 4. For instance, the attitude identification circuitry 200 may be instantiated by the example microprocessor 500 of FIG. 5 executing machine executable instructions such as those implemented by at least blocks 304, 310, 312, 322 of FIG. 3. In some examples, the attitude identification circuitry 200 may be instantiated by hardware logic circuitry, which may be implemented by an ASIC, XPU, or the FPGA circuitry 600 of FIG. 6 configured and/or structured to perform operations corresponding to the machine readable instructions. Additionally or alternatively, the attitude identification circuitry 200 may be instantiated by any other combination of hardware, software, and/or firmware. For example, the attitude identification circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the calibration control circuitry 102 includes means for analyzing signal power. For example, the means for analyzing may be implemented by the signal power analysis circuitry 202. In some examples, the signal power analysis circuitry 202 may be instantiated by programmable circuitry such as the example programmable circuitry 412 of FIG. 4. For instance, the signal power analysis circuitry 202 may be instantiated by the example microprocessor 500 of FIG. 5 executing machine executable instructions such as those implemented by at least blocks 306, 308, 314, 316 of FIG. 3. In some examples, the signal power analysis circuitry 202 may be instantiated by hardware logic circuitry, which may be implemented by an ASIC, XPU, or the FPGA circuitry 600 of FIG. 6 configured and/or structured to perform operations corresponding to the machine readable instructions. Additionally or alternatively, the signal power analysis circuitry 202 may be instantiated by any other combination of hardware, software, and/or firmware. For example, the signal power analysis circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the calibration control circuitry 102 includes means for determining offsets. For example, the means for determining may be implemented by the offset determination circuitry 204. In some examples, the offset determination circuitry 204 may be instantiated by programmable circuitry such as the example programmable circuitry 412 of FIG. 4. For instance, the offset determination circuitry 204 may be instantiated by the example microprocessor 500 of FIG. 5 executing machine executable instructions such as those implemented by at least blocks 306, 308, 314, 316 of FIG. 3. In some examples, the offset determination circuitry 204 may be instantiated by hardware logic circuitry, which may be implemented by an ASIC, XPU, or the FPGA circuitry 600 of FIG. 6 configured and/or structured to perform operations corresponding to the machine readable instructions. Additionally or alternatively, the offset determination circuitry 204 may be instantiated by any other combination of hardware, software, and/or firmware. For example, the offset determination circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the calibration control circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example attitude identification circuitry 200, the example signal power analysis circuitry 202, the example offset determination circuitry 204, and/or, more generally, the example calibration control circuitry 102 of FIG. 2, may be implemented by hardware alone or by hardware in combination with software and/or firmware. Thus, for example, any of the example attitude identification circuitry 200, the example signal power analysis circuitry 202, the example offset determination circuitry 204, and/or, more generally, the example calibration control circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example calibration control circuitry 102 of FIG. 2 may include one or more elements, processes, and/or devices in addition to, or instead of, those illustrated in FIG. 2, and/or may include more than one of any or all of the illustrated elements, processes, and devices.

Figure 3:
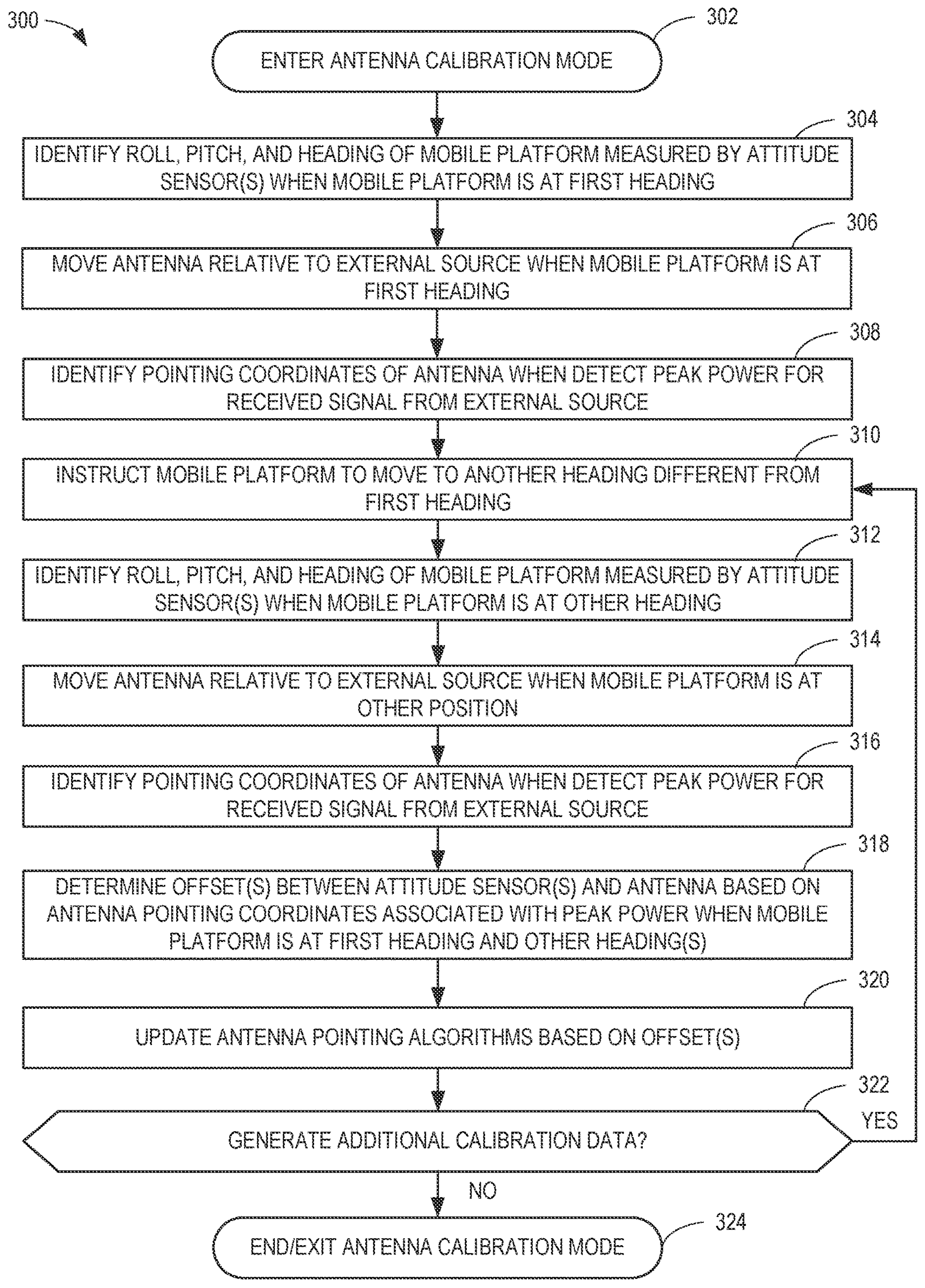
FIG. 3 is a flowchart representative of example machine readable instructions and/or example operations that may be executed, instantiated, and/or performed by example programmable circuitry to implement the calibration control circuitry of FIG. 2.

A flowchart representative of example machine readable instructions, which may be executed by programmable circuitry to implement and/or instantiate the calibration control circuitry 102 of FIG. 2 and/or representative of example operations which may be performed by programmable circuitry to implement and/or instantiate the calibration control circuitry 102 of FIG. 2, is shown in FIG. 3. The machine readable instructions may be one or more executable programs or portion(s) of one or more executable programs for execution by programmable circuitry such as the programmable circuitry 412 shown in the example processor platform 400 discussed below in connection with FIG. 4 and/or may be one or more function(s) or portion(s) of functions to be performed by the example programmable circuitry (e.g., an FPGA) discussed below in connection with FIGS. 5 and/or 6. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 3, many other methods of implementing the example calibration control circuitry 102 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 3 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed, instantiated, and/or performed by programmable circuitry to perform calibration for positioning an antenna carried by a mobile platform. The example machine-readable instructions and/or the example operations 300 of FIG. 3 begin at block 302 in which the mobile platform 106 enters an antenna calibration mode based on, for example, user input(s), a predefined calibration schedule, etc.

At block 304, the attitude identification circuitry 200 of the example calibration control circuitry 102 identifies roll, pitch, and heading of the mobile platform 106 based on outputs of the attitude sensor(s) 118 when the mobile platform 106 is at a first heading. The roll, pitch, and heading of the mobile platform 106 when the mobile platform 106 is at the first heading can be considered a zero point (e.g., (0, 0, 0) for the attitude sensor(s) 118 for purposes of the calibration analysis.

At block 306, the signal power analysis circuitry 202 of the example calibration control circuitry 102 communicates with the antenna positioning circuitry 114 of the mobile platform 106 to cause the actuator(s) 116 to move the antenna 104 relative to the external source 108 (e.g., a satellite) when the mobile platform 106 is at the first heading. At block 308, the signal power analysis circuitry 202 detects when the antenna 104 is pointed such that a peak power from the signal(s) received from the external source 108 is achieved (e.g., a maximum received signal strength is obtained). The signal power analysis circuitry 202 can analyze signal power levels detected by, for example, the modem 112 of the mobile platform 106 as the actuator(s) 116 move or steer the antenna 104 relative to the external source 108. The signal power analysis circuitry 202 identifies the pointing coordinates of the antenna 104 representing an angular position of the antenna 104 when the peak power is detected.

At block 310, the attitude identification circuitry 200 instructs the mobile platform to move to another (e.g., second) heading different from the first heading. At block 312, the attitude identification circuitry 200 records the roll, pitch, and heading of the mobile platform 106 based on outputs of the attitude sensor(s) 118 when the mobile platform 106 is at the other (e.g., second) heading.

At block 314, the signal power analysis circuitry 202 communicates with the antenna positioning circuitry 114 to cause the actuator(s) 116 to move the antenna 104 relative to the external source 108 when the mobile platform 106 is at the other (e.g., second) heading. At block 316, the signal power analysis circuitry 202 detects when the antenna 104 is pointed such that a peak power for the signal(s) received from the external source 108 is achieved. The signal power analysis circuitry 202 identifies the pointing coordinates of the antenna 104 representing an angular position of the antenna 104 when the peak power is detected and the mobile platform 106 is at the other (e.g., second) heading.

At block 318, the offset determination circuitry 204 of the example calibration control circuitry 102 determines installation offset(s) between the attitude sensor(s) 118 and the antenna 104 based on the pointing coordinates for the antenna 104 associated with the detection peak power for the received signal and when the mobile platform 106 was at the respective headings (e.g., the first heading, the second heading). For example, the offset determination circuitry 204 can perform triangulation to solve for roll, pitch, and heading of the mobile platform 106 using the (at least two) sets of antenna pointing coordinates associated with the peak power measurements and the different headings of the mobile platform 106 when the antenna pointing coordinates were identified. The offset determination circuitry 204 can compare the roll, pitch, and heading values determined using the antenna pointing coordinates with the roll, pitch, and heading values measured by the attitude sensor(s) 118 when the mobile platform 106 was at the first heading (e.g., the assumed zero point values). Based on the comparison, the offset determination circuitry 204 determines if there are any differences or offsets with respect to the roll, pitch, and heading measurements.

At block 320, the offset determination circuitry 204 communicates with the antenna positioning circuitry 114 to update or adjust the antenna pointing algorithm(s) used by the antenna positioning circuitry 114 to position the antenna relative to the external source 108 (or another external source) based on the determined roll, pitch, and/or heading offset(s). For example, the offset(s) can serve as adjustment factor(s) for modifying the measurements obtained from the attitude sensor(s) 118 and used by the pointing algorithms to point or steer the antenna 104.

At block 322, the attitude identification circuitry 200 determines if the mobile platform 106 should be moved to another heading to generate additional calibration data for identifying the offset(s) between the attitude sensor(s) 118 and the antenna 104. The example instructions 300 of FIG. 3 end at block 324 when no further calibration data is to be generated.

Figure 4:
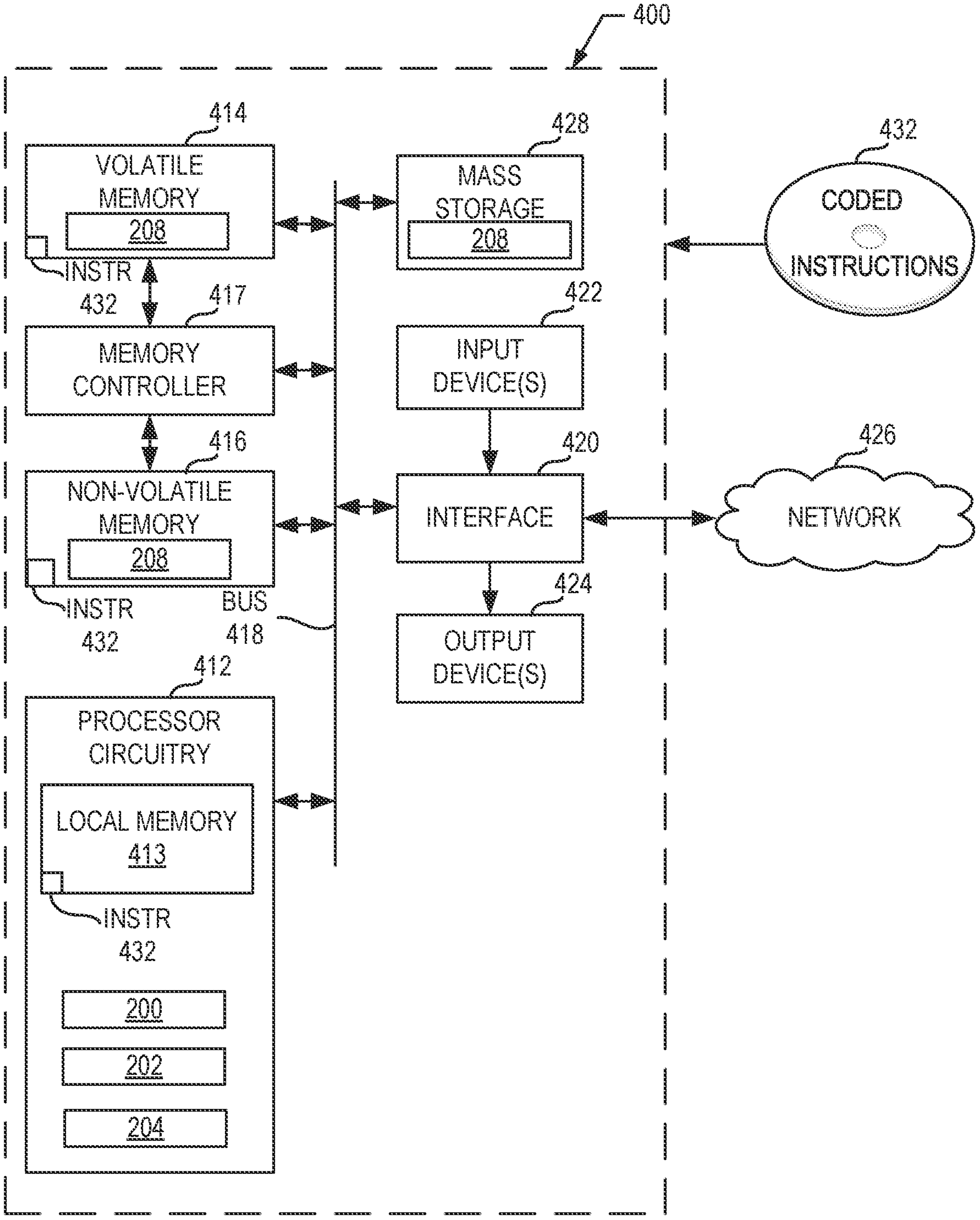
FIG. 4 is a block diagram of an example processing platform including programmable circuitry structured to execute, instantiate, and/or perform the example machine readable instructions and/or perform the example operations of FIG. 3 to implement the calibration control circuitry of FIG. 2.

FIG. 4 is a block diagram of an example programmable circuitry platform 400 structured to execute and/or instantiate the example machine-readable instructions and/or the example operations of FIG. 3 to implement the calibration control circuitry 102 of FIG. 2. The programmable circuitry platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device.

The programmable circuitry platform 400 of the illustrated example includes programmable circuitry 412. The programmable circuitry 412 of the illustrated example is hardware. For example, the programmable circuitry 412 can be implemented by one or more integrated circuits, logic circuits, FPGAs, microprocessors, CPUs, GPUs, DSPs, and/or microcontrollers from any desired family or manufacturer. The programmable circuitry 412 may be implemented by one or more semiconductor based (e.g., silicon based) devices. In this example, the programmable circuitry 412 implements the example attitude identification circuitry 200, the example signal power analysis circuitry 202, and the example offset determination circuitry 204.

The programmable circuitry 412 of the illustrated example includes a local memory 413 (e.g., a cache, registers, etc.). The programmable circuitry 412 of the illustrated example is in communication with main memory 414, 416, which includes a volatile memory 414 and a non-volatile memory 416, by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. In some examples, the memory controller 417 may be implemented by one or more integrated circuits, logic circuits, microcontrollers from any desired family or manufacturer, or any other type of circuitry to manage the flow of data going to and from the main memory 414, 416.

The programmable circuitry platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user (e.g., a human user, a machine user, etc.) to enter data and/or commands into the programmable circuitry 412. The input device(s) 422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 400 of the illustrated example also includes one or more mass storage discs or devices 428 to store firmware, software, and/or data. Examples of such mass storage discs or devices 428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 432, which may be implemented by the machine readable instructions of FIG. 3, may be stored in the mass storage device 428, in the volatile memory 414, in the non-volatile memory 416, and/or on at least one non-transitory computer readable storage medium such as a CD or DVD which may be removable.

Figure 5:
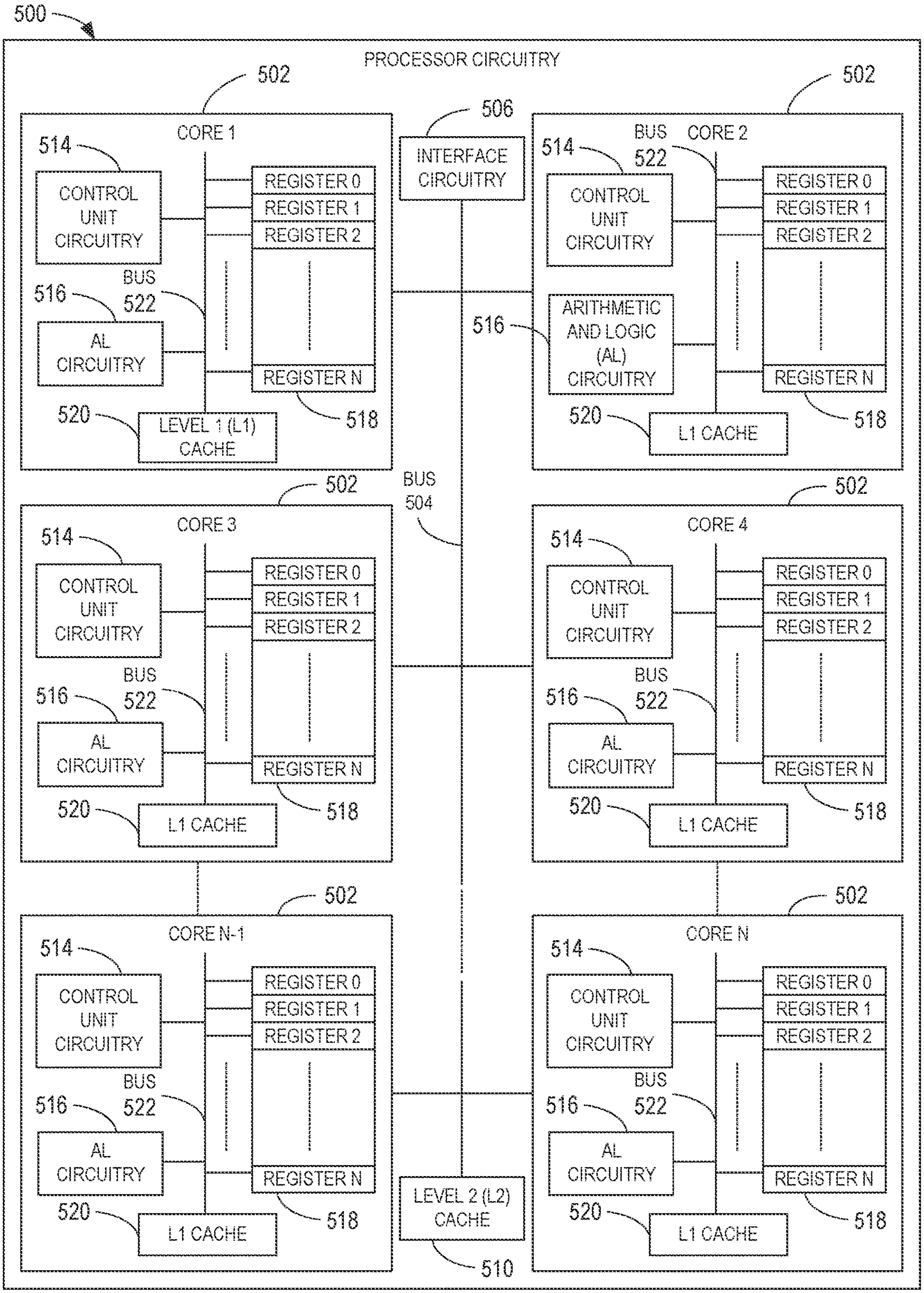
FIG. 5 is a block diagram of an example implementation of the programmable circuitry of FIG. 4.

FIG. 5 is a block diagram of an example implementation of the programmable circuitry 412 of FIG. 4. In this example, the programmable circuitry 412 of FIG. 4 is implemented by a microprocessor 500. For example, the microprocessor 500 may be a general-purpose microprocessor (e.g., general-purpose microprocessor circuitry). The microprocessor 500 executes some or all of the machine-readable instructions of the flowchart of FIG. 3 to effectively instantiate the circuitry of FIG. 2 as logic circuits to perform operations corresponding to those machine readable instructions. In some such examples, the circuitry of FIG. 2 is instantiated by the hardware circuits of the microprocessor 500 in combination with the machine-readable instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIG. 3.

The cores 502 may communicate by a first example bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating-point operations. In yet other examples, the AL circuitry 516 may include first AL circuitry that performs integer-based operations and second AL circuitry that performs floating-point operations. In some examples, the AL circuitry 516 may be referred to as an Arithmetic Logic Unit (ALU).

The registers 518 are semiconductor-based structures to store data and/or instructions such as results of one or more of the operations performed by the AL circuitry 516 of the corresponding core 502. For example, the registers 518 may include vector register(s), SIMD register(s), general-purpose register(s), flag register(s), segment register(s), machine-specific register(s), instruction pointer register(s), control register(s), debug register(s), memory management register (s), machine check register(s), etc. The registers 518 may be arranged in a bank as shown in FIG. 5. Alternatively, the registers 518 may be organized in any other arrangement, format, or structure, such as by being distributed throughout the core 502 to shorten access time. The second bus 522 may be implemented by at least one of an I2C bus, a SPI bus, a PCI bus, or a PCIe bus.

Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages.

The microprocessor 500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 500, in the same chip package as the microprocessor 500 and/or in one or more separate packages from the microprocessor 500.

Figure 6:
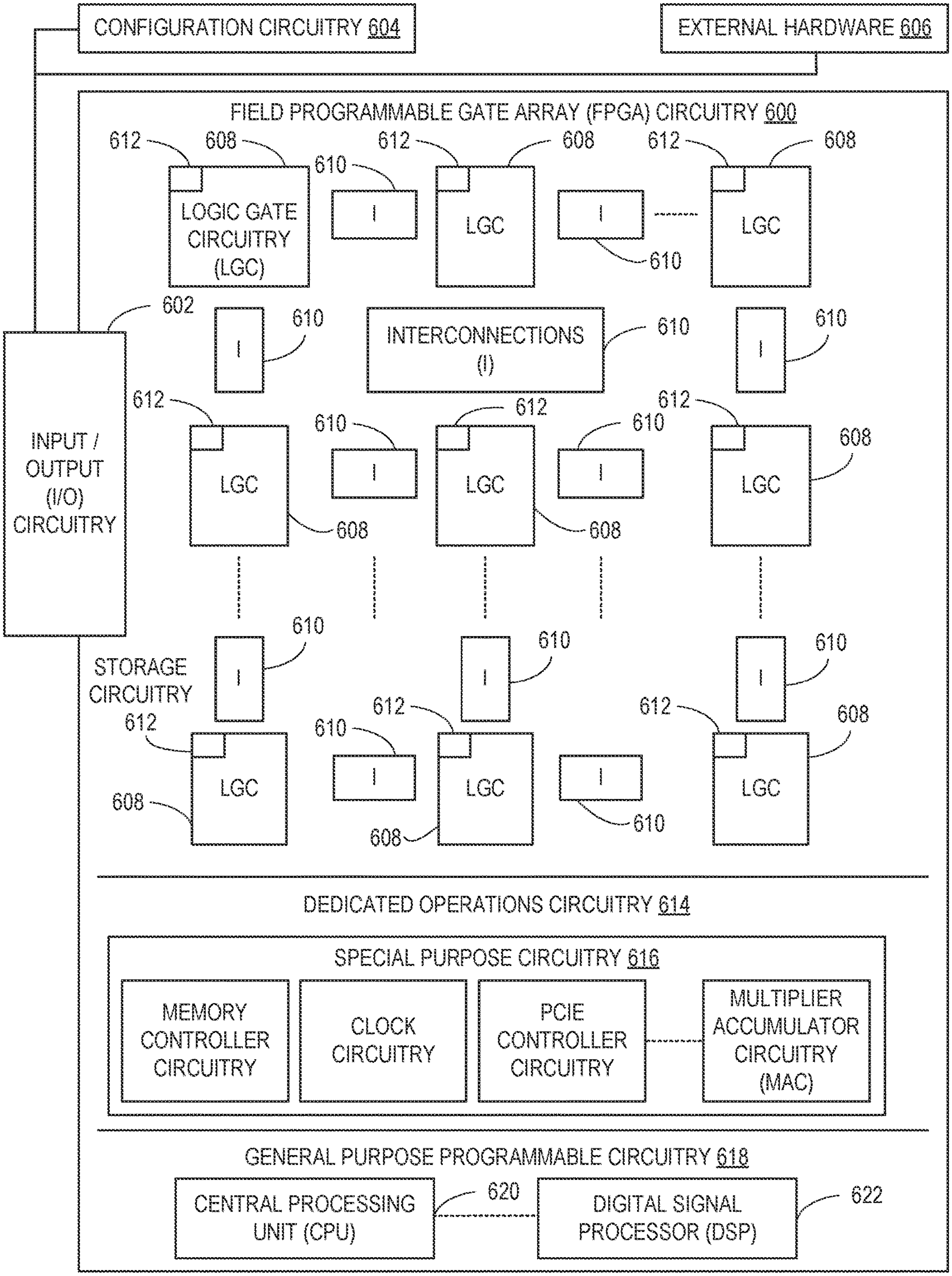
FIG. 6 is a block diagram of another example implementation of the programmable circuitry of FIG. 4.

FIG. 6 is a block diagram of another example implementation of the programmable circuitry 412 of FIG. 4. In this example, the programmable circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 500 of FIG. 5 described above (which is a general purpose device that may be programmed to execute some or all of the machine readable instructions represented by the flowchart of FIG. 3 but whose interconnections and logic circuitry are fixed once fabricated), the FPGA circuitry 600 of the example of FIG. 6 includes interconnections and logic circuitry that may be configured, structured, programmed, and/or interconnected in different ways after fabrication to instantiate, for example, some or all of the operations/functions corresponding to the machine readable instructions represented by the flowchart of FIG. 3. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 3. As such, the FPGA circuitry 600 may be configured and/or structured to effectively instantiate some or all of the operations/functions corresponding to the machine readable instructions of the flowchart of FIG. 3 as dedicated logic circuits to perform the operations/functions corresponding to those software instructions in a dedicated manner analogous to an ASIC. Therefore, the FPGA circuitry 600 may perform the operations/functions corresponding to the some or all of the machine readable instructions of FIG. 3 faster than the general-purpose microprocessor can execute the same.

In the example of FIG. 6, the FPGA circuitry 600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain a binary file, which may be implemented by a bit stream, data, and/or machine-readable instructions, to configure the FPGA circuitry 600, or portion(s) thereof. In some such examples, the configuration circuitry 604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 606 may be implemented by external hardware circuitry. For example, the external hardware 606 may be implemented by the microprocessor 500 of FIG. 5.

The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations/functions that may correspond to at least some of the machine readable instructions of FIG. 3 and/or other desired operations. The logic gate circuitry 608 shown in FIG. 6 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations/functions. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example dedicated operations circuitry 614. In this example, the dedicated operations circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the programmable circuitry 412 of FIG. 4, many other approaches are contemplated. For example, FPGA circuitry may include an on-board CPU, such as one or more of the example CPU 620 of FIG. 5. Therefore, the programmable circuitry 412 of FIG. 4 may additionally be implemented by combining at least the example microprocessor 500 of FIG. 5 and the example FPGA circuitry 600 of FIG. 6. In some such hybrid examples, one or more cores 502 of FIG. 5 may execute a first portion of the machine readable instructions represented by the flowchart of FIG. 3 to perform first operation(s)/function(s), the FPGA circuitry 600 of FIG. 6 may be configured and/or structured to perform second operation(s)/function(s) corresponding to a second portion of the machine readable instructions represented by the flowchart of FIG. 3, and/or an ASIC may be configured and/or structured to perform third operation(s)/function(s) corresponding to a third portion of the machine readable instructions represented by the flowchart of FIG. 3.

It should be understood that some or all of the circuitry of FIG. 2 may, thus, be instantiated at the same or different times. For example, same and/or different portion(s) of the microprocessor 500 of FIG. 5 may be programmed to execute portion(s) of machine-readable instructions at the same and/or different times. In some examples, same and/or different portion(s) of the FPGA circuitry 600 of FIG. 6 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 500 of FIG. 5 may execute machine readable instructions in one or more threads executing concurrently and/or in series. In some examples, the FPGA circuitry 600 of FIG. 6 may be configured and/or structured to carry out operations/functions concurrently and/or in series. Moreover, in some examples, some or all of the circuitry of FIG. 2 may be implemented within one or more virtual machines and/or containers executing on the microprocessor 500 of FIG. 5.

In some examples, the programmable circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the programmable circuitry 412 of FIG. 4, which may be in one or more packages. For example, the XPU may include a CPU (e.g., the microprocessor 500 of FIG. 5, the CPU 620 of FIG. 6, etc.) in one package, a DSP (e.g., the DSP 622 of FIG. 6) in another package, a GPU in yet another package, and an FPGA (e.g., the FPGA circuitry 600 of FIG. 6) in still yet another package.

Figure 7:
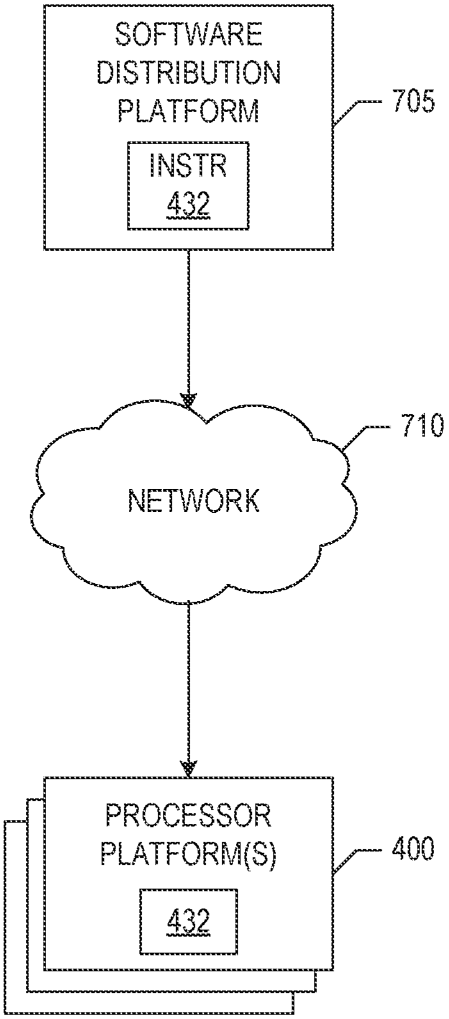
FIG. 7 is a block diagram of an example software/firmware/instructions distribution platform (e.g., one or more servers) to distribute software, instructions, and/or firmware (e.g., corresponding to the example machine readable instructions of FIG. 3 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine readable instructions 432 of FIG. 4 to other hardware devices (e.g., hardware devices owned and/or operated by third parties from the owner and/or operator of the software distribution platform) is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine readable instructions 432, which may correspond to the example machine readable instructions of FIG. 3, as described above. The one or more servers of the example software distribution platform 705 are in communication with an example network 710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 432 from the software distribution platform 705. For example, the software, which may correspond to the example machine readable instructions of FIG. 3, may be downloaded to the example programmable circuitry platform 400, which is to execute the machine readable instructions 432 to implement the calibration control circuitry 102. In some examples, one or more servers of the software distribution platform 705 periodically offer, transmit, and/or force updates to the software (e.g., the example machine readable instructions 432 of FIG. 4) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that provide for calibration of an antenna carried by a mobile platform (e.g., an aerial vehicle). Examples disclosed herein identify offsets between attitude sensor(s) of the mobile platform and the antenna using received signal strength and associated antenna pointing coordinates when the mobile platform is at different headings. As a result of the calibration, antenna pointing algorithms can be adjusted to account for the installation offset(s) between the attitude sensor(s) and the antenna, thereby increasing the accuracy with which the antenna is pointed for communication with an external source in, for instance, a SATCOM system. Example calibrations disclosed herein can be performed while the mobile platform is in operation (e.g., on a runway), thereby providing for efficient identification of installation offsets between the attitude sensor(s) and the antenna.

Example systems, apparatus, and method for calibration of satellite communication antennas are disclosed. Further examples and combinations thereof include the following:

Example 1 includes an aerial vehicle comprising an antenna; an attitude sensor; machine-readable instructions; and programmable circuitry to at least one of instantiate or execute the machine-readable instructions to at least: identify a first angular position of the antenna associated with a peak power of a signal received by the antenna when the aerial vehicle is at a first heading; identify a second angular position of the antenna associated with a peak power of a signal received by the antenna when the aerial vehicle is at a second heading, the second heading different than the first heading; determine an offset between the attitude sensor and the antenna based on the first angular position and the second angular position; and cause a pointing angle of the antenna relative to an external source to be adjusted based on the offset.

Example 2 includes the aerial vehicle of example 1, wherein the programmable circuitry is to determine the offset by determining a roll value, a pitch value, and a heading value for the aerial vehicle based on first coordinates associated with the first angular position and second coordinates associated with the second angular position; and performing a comparison of the determined roll value, the determined pitch value, and the determined heading value to a roll value, a pitch value, and a heading value measured by the attitude sensor when the aerial vehicle is at the first heading.

Example 3 includes the aerial vehicle of examples 1 or 2, wherein the programmable circuitry is to cause an output of the attitude sensor to be adjusted based on the offset.

Example 4 includes the aerial vehicle of any of examples 1-3, wherein the programmable circuitry is to execute a pointing algorithm based on the adjusted output of the attitude sensor to determine the pointing angle of the antenna relative to the external source.

Example 5 includes the aerial vehicle of any of examples 1-4, wherein the programmable circuitry is to cause the antenna to move between a plurality of angular positions when the aerial vehicle is at the first heading; and identify the first angular position based on received signal strength associated with respective ones of the plurality of angular positions.

Example 6 includes the aerial vehicle of any of examples 1-5, wherein the attitude sensor is separate from the antenna.

Example 7 includes a non-transitory machine readable storage medium comprising instructions to cause programmable circuitry to at least cause an antenna carried by a mobile platform to move when the mobile platform is associated with first attitude data; identity, based on a received signal strength of a signal received by the antenna when the mobile platform is associated with the first attitude data, a first set of pointing coordinates for the antenna; cause the antenna to move when the mobile platform is associated with second attitude data; identify, based on a received signal strength of a signal received by the antenna when the mobile platform is associated with the second attitude data, a second set of pointing coordinates for the antenna; determine an offset between the antenna and an attitude sensor of the mobile platform based on the first set of pointing coordinates and the second set of pointing coordinates; and modify an output of the attitude sensor of the mobile platform based on the offset.

Example 8 includes the non-transitory machine readable storage medium of example 7, wherein the instructions cause the programmable circuitry to determine an angular position of the antenna relative to a satellite based on the modified output of the attitude sensor.

Example 9 includes the non-transitory machine readable storage medium of examples 7 or 8, wherein the instructions cause the programmable circuitry to determine the offset by determining a first roll value, a first pitch value, and a first heading value based on the first set of pointing coordinates and the second set of pointing coordinates; and performing a comparison of the first roll value, the first pitch value, and the first heading value to a second roll value, a second pitch value, and a second heading value, the first attitude data including the second roll value, the second pitch value, and the second heading value.

Example 10 includes the non-transitory machine readable storage medium of any of examples 7-9, wherein the instructions cause the programmable circuitry to determine the first roll value, the first pitch value, and the first heading value based on triangulation.

Example 11 includes the non-transitory machine readable storage medium of any of examples 7-10, wherein the instructions cause the programmable circuitry to identify the first set of pointing coordinates based on a maximum received signal strength associated with a positioning of the antenna at the first set of pointing coordinates.

Example 12 includes the non-transitory machine readable storage medium of any of examples 7-11, wherein the first attitude data includes a first heading and the second attitude data includes a second heading, the second heading different than the first heading.

Example 13 includes the non-transitory machine readable storage medium of any of examples 7-12, wherein the mobile platform includes an aerial vehicle.

Example 14 includes an apparatus comprising interface circuitry; machine readable instructions; and programmable circuitry to at least one of instantiate or execute the machine readable instructions to at least: identify a first angular position of an antenna of a mobile platform when the mobile platform is associated with first attitude data, the first attitude data measured by an attitude sensor of a mobile platform at a first time; identify a second angular position of the antenna when the mobile platform is associated with second attitude data, the second attitude data measured by the attitude sensor at a second time, the second time after the first time; determine an installation offset between the attitude sensor and the antenna based on the first angular position, the second angular position, the first attitude data, and the second attitude data; and cause position of the antenna relative to an external source to be determined based on the installation offset.

Example 15 includes the apparatus of example 14, wherein the programmable circuitry is to identify the first angular position based on detection of peak power for a signal received at the antenna.

Example 16 includes the apparatus of examples 14 or 15, wherein programmable circuitry is to determine a roll, a pitch, and a heading for the mobile platform based on first antenna coordinates representing the first angular position and second antenna coordinates representing the second angular position; and determine the installation offset based on a difference between one or more of the determined roll, the determined pitch, or the determined heading and a corresponding one or more of a measured roll, a measured pitch, or a measured heading, the first attitude data including the measured roll, the measured pitch, and the measured heading.

Example 17 includes the apparatus of any of examples 14-16, wherein the programmable circuitry is to execute a triangular algorithm to determine the roll, the pitch, and the heading for the mobile platform based on the first antenna coordinates and the second antenna coordinates.

Example 18 includes the apparatus of any of examples 14-17, wherein the programmable circuitry is to cause an antenna pointing algorithm to be adjusted based on the installation offset.

Example 19 includes the apparatus of any of examples 14-18, wherein programmable circuitry is to adjust third attitude data output by the attitude sensor based on the installation offset, the antenna pointing algorithm to use the adjusted third attitude data to point the antenna.

Example 20 includes the apparatus of any of examples 14-19, wherein the mobile platform is an unmanned aerial vehicle.

Example 21 includes a method for calibrating a satellite communication antenna, the method comprising detecting a first angular position of the antenna associated with a peak power of a signal received by the satellite communication antenna when a mobile platform carrying the satellite communication antenna is at a first heading; detecting a second angular position of the satellite communication antenna associated with a peak power of a signal received by the satellite communication antenna when the mobile platform is at a second heading, the second heading different than the first heading; identifying an installation offset between an attitude sensor of the mobile platform and the satellite communication antenna based on the first angular position and the second angular position; and causing a pointing angle of the satellite communication antenna relative to an external source to be adjusted based on the installation offset.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An aerial vehicle comprising:

an antenna;

an attitude sensor to measure attitude values when the aerial vehicle is at a first heading, the attitude values including a roll value, a pitch value, and a heading value;

machine-readable instructions; and at least one programmable circuit to at least one of instantiate or execute the machine-readable instructions to at least:

identify a first angular position of the antenna associated with a peak power of a signal received by the antenna when the aerial vehicle is at the first heading;

identify a second angular position of the antenna associated with a peak power of a signal received by the antenna when the aerial vehicle is at a second heading, the second heading different than the first heading;

determine an offset between the attitude sensor and the antenna based on the first angular position, the second angular position, and the attitude values; and cause a pointing angle of the antenna relative to an external source to be adjusted based on the offset.

2. The aerial vehicle of claim 1, wherein one or more of the at least one programmable circuit is to determine the offset by:

determining a roll value, a pitch value, and a heading value for the aerial vehicle based on first coordinates associated with the first angular position and second coordinates associated with the second angular position; and performing a comparison of the determined roll value, the determined pitch value, and the determined heading value to the roll value, the pitch value, and the heading value measured by the attitude sensor when the aerial vehicle is at the first heading.

3. The aerial vehicle of claim 1, wherein one or more of the at least one programmable circuit is to cause an output of the attitude sensor to be adjusted based on the offset.

4. The aerial vehicle of claim 3, wherein one or more of the at least one programmable circuit is to execute a pointing algorithm based on the adjusted output of the attitude sensor to determine the pointing angle of the antenna relative to the external source.

5. The aerial vehicle of claim 1, wherein one or more of the at least one programmable circuit is to:

cause the antenna to move between a plurality of angular positions when the aerial vehicle is at the first heading; and identify the first angular position based on received signal strength associated with respective ones of the plurality of angular positions.

6. The aerial vehicle of claim 1, wherein the attitude sensor is separate from the antenna.

* * * * *